(12) United States Patent
Riddle

(10) Patent No.: US 7,545,748 B1
(45) Date of Patent: Jun. 9, 2009

(54) CLASSIFICATION AND MANAGEMENT OF NETWORK TRAFFIC BASED ON ATTRIBUTES ORTHOGONAL TO EXPLICIT PACKET ATTRIBUTES

(75) Inventor: Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 814 days.

(21) Appl. No.: 10/938,435

(22) Filed: Sep. 10, 2004

(51) Int. Cl.
*H04L 12/28* (2006.01)

(52) U.S. Cl. .................. 370/235; 370/230; 370/252; 370/389

(58) Field of Classification Search .......... 370/229–235
See application file for complete search history.

(56) References Cited

U.S. PATENT DOCUMENTS

| | | | |
|---|---|---|---|
| 4,914,650 A | 4/1990 | Sriram | |
| 5,828,846 A * | 10/1998 | Kirby et al. | 709/238 |
| 6,003,077 A | 12/1999 | Bawden et al. | |
| 6,023,456 A | 2/2000 | Chapman et al. | |
| 6,046,980 A | 4/2000 | Packer | |
| 6,219,050 B1 | 4/2001 | Schaffer | |
| 6,285,660 B1 | 9/2001 | Ronen | |
| 6,397,359 B1 | 5/2002 | Chandra et al. | |
| 6,584,467 B1 | 6/2003 | Haught et al. | |
| 6,625,648 B1 * | 9/2003 | Schwaller et al. | 709/224 |
| 6,681,232 B1 | 1/2004 | Sistanizadeh et al. | |
| 6,701,359 B1 | 3/2004 | Calabrez et al. | |
| 6,738,352 B1 | 5/2004 | Yamada et al. | |
| 6,798,763 B1 | 9/2004 | Kimura et al. | |
| 6,894,972 B1 | 5/2005 | Phaal | |
| 7,120,931 B1 * | 10/2006 | Cheriton | 726/13 |
| 7,193,968 B1 * | 3/2007 | Kapoor et al. | 370/235 |
| 7,215,637 B1 * | 5/2007 | Ferguson et al. | 370/230.1 |
| 7,296,288 B1 | 11/2007 | Hill | |
| 7,385,924 B1 | 6/2008 | Riddle | |
| 2002/0122427 A1 | 9/2002 | Kamenisky et al. | |
| 2002/0143901 A1 | 10/2002 | Lupo et al. | |
| 2003/0035365 A1 | 2/2003 | Walsh et al. | |
| 2003/0112764 A1 | 6/2003 | Gaspard et al. | |
| 2004/0125815 A1 * | 7/2004 | Shimazu et al. | 370/411 |
| 2006/0045014 A1 * | 3/2006 | Charzinski | 370/235 |

OTHER PUBLICATIONS

U.S. Appl. No. 10/917,952, filed Aug. 2004, Yung.
U.S. Appl. No. 11/019,501, filed Dec. 2004, Muppala.

* cited by examiner

*Primary Examiner*—Phuc H Tran
(74) *Attorney, Agent, or Firm*—Baker Botts L.L.P.

(57) ABSTRACT

Classification of network traffic based on conditions orthogonal to explicit attributes of packets in network traffic. In one implementation, classification of network traffic based on the behavior of one or more nodes associated with the network traffic. In one implementation, a mechanism is provided that allows for the creation of matching rule predicates that match to certain node behaviors of interest and cause the application of appropriate policies to the network traffic. In one implementation, the node behavior matching functionality can be combined to seamlessly operate in connection with other Layer 7 traffic classification mechanisms that operate on explicitly-presented attributes of the packets.

19 Claims, 6 Drawing Sheets

Fig._1

(PRIOR ART)

| IP Address | Conn | RTT to PS | Curr Rate | 1 Min Avg | Peak Rate | *New Flows Per Minute* | | |
|---|---|---|---|---|---|---|---|---|
| | | | | | | Client | Server | Failed |
| 216.203.49.219 | 0 | 80ms | 2730 | 420 | 2730 | 0 | 90 | 0 |
| 216.148.237.158 | 1 | 14ms | 235k | 19.1k | 235k | 0 | 84 | 0 |
| 216.148.237.145 | 5 | 48ms | 2303 | 4871 | 49k | 0 | 64 | 0 |
| 10.7.15.8 | 11 | 3ms | 310k | 58.9k | 310k | 42 | 0 | 0 |
| 10.255.255.255 | 2 | *** | 3397 | 3464 | 17.6k | 0 | 28 | 0 |
| 10.7.15.4 | 0 | *** | 654 | 190 | 1112 | 11 | 6 | 0 |
| 10.1.1.40 | 0 | *** | 643 | 188 | 1112 | 6 | 11 | 0 |
| 207.46.249.61 | 0 | 25ms | 15.2k | 20.5k | 220k | 0 | 14 | 0 |
| 10.1.1.16 | 1 | *** | 3657 | 2905 | 17.7k | 0 | 11 | 0 |
| 255.255.255.255 | 1 | *** | 1735 | 430 | 5357 | 0 | 4 | 0 |
| 10.7.11.2 | 0 | *** | 0 | 0 | 11.1k | 3 | 0 | 0 |
| 10.7.15.13 | 2 | *** | 549 | 252 | 11.3k | 0 | 3 | 0 |
| 66.218.71.83 | 2 | 124ms | 492 | 4217 | 90.6k | 0 | 2 | 0 |
| 10.2.1.10 | 0 | *** | 0 | 0 | 343 | 1 | 0 | 0 |
| 239.255.255.253 | 2 | *** | 39 | 25 | 1305 | 0 | 1 | 0 |
| 10.7.15.5 | 0 | *** | 485 | 318 | 8787 | 1 | 0 | 0 |
| 10.1.1.18 | 1 | *** | 1349 | 771 | 2091 | 1 | 0 | 0 |
| 10.10.254.74 | 0 | *** | 0 | 54 | 345 | 1 | 0 | 0 |
| 10.10.253.70 | 0 | *** | 0 | 0 | 37 | 0 | 0 | 0 |
| 10.7.31.22 | 0 | *** | 0 | 0 | 2 | 0 | 0 | 0 |

CLASSIFICATION AND MANAGEMENT OF NETWORK TRAFFIC BASED ON ATTRIBUTES ORTHOGONAL TO EXPLICIT PACKET ATTRIBUTES

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442 in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensionat Network Traffic Classification and Control Schemes;"

U.S. patent application Ser. No. 10/295,391, in the name of Mark Hill, Guy Riddle and Robert Purvy, entitled "Methods, Apparatuses, and Systems Allowing for Bandwidth Management Schemes Responsive to Utilization Characteristics Associated with Individual Users;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/611,573, in the name of Roopesh Varier, David Jacobson, and Guy Riddle, entitled "Network Traffic Synchronization Mechanism;"

U.S. patent application Ser. No. 10/676,383 in the name of Guy Riddle, entitled "Enhanced Flow Data Records Including Traffic Type Data;"

U.S. patent application Ser. No. 10/720,329 in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;" and U.S. patent application Ser. No. 10/843,185 in the name of Guy Riddle, Curtis Bradford and Maddie Cheng, entitled "Packet Load Shedding."

FIELD OF THE INVENTION

The present invention relates to classification and/or management of network traffic and, more particularly, to methods, apparatuses and systems directed to the classification of network traffic based on flow attributes orthogonal to explicit attributes of the packets in the flows, such as observed node behavior.

BACKGROUND OF THE INVENTION

Enterprises have become increasingly dependent on computer network infrastructures to provide services and accomplish mission-criticat tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprises network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

Given the vast array of enterprise network topologies and the reliance on open computer networks, enterprises are confronted with a number of potential problems. For example, Denial-of-Service (DoS) attacks are a common concern among network administrators. For example, a distributed denial-of-service (DDOS) attack is one in which a multitude of compromised hosts attack a single target, such as a web server, by transmitting large numbers of packets to deny service for legitimate users of the targeted system. Specifically, the veritable flood of incoming messages to the targeted system essentially forces it to shut down, thereby denying services of the system to legitimate users. U.S. application Ser. No. 10/843,185, incorporated by reference above, describes various types of DDOS attacks and the problems created by them. In addition to posing a problem for the targeted end systems, these DoS attacks also create problems for network devices, such as application traffic management systems, disposed at the edge of enterprise networks and/or at a point in the communications path between a compromised end system and a targeted system. For example and referring to FIG. 1, assume for didactic purposes, that end systems 42 on network 40 have been comprised and have initiated a DoS attack against targeted system 43. As discussed above, the compromised end systems 42 transmit a large number of ICMP or SYN packets, for example, to the targeted system 43. An application traffic management device 30, for example, encounters these packets and, pursuant to its configuration, processes the packets as part of its application traffic management functions. Processing the inordinate number of packets from the compromised end systems, however, quickly overwhelms the capacity of the network device 30, such as the system bus, and central processing unit (CPU), requiring that a large number of packets be dropped.

To address these concerns various technologies have been developed. For example, U.S. application Ser. No. 10/676,383 discloses network traffic data collection mechanisms that can be configured to allow a network administrator to identify unusual traffic patterns from hosts that would point at probable computer virus infections. In addition, U.S. application Ser. No. 10/843,185 discloses packet load shedding mechanisms that protect a network device in the presence of many infected hosts, allowing it to continue performing its intended function, such as providing QoS for network applications. U.S. application Ser. No. 10/720,329 discloses methods for heuristically analyzing the behavior of end systems against known behavior profiles to classify applications. While these mechanisms operate effectively relative to their intended objectives and facilitate identification of possibly infected hosts (or other network applications), often times the workflow entailed involves many manual steps with few tools available to automatically apply network controls to contain the traffic emanating from these infected hosts. In addition, traditional classification mechanisms, which generally operate on explicitly presented attributes of the packets themselves (e.g., protocol identifiers, header fields, etc.), are often difficult to apply to network traffic emanating from infected hosts as the signatures (and behavior profiles) of such viruses are not known and change rapidly. Other problematic network technologies are peer-to-peer file sharing systems that are beginning to employ sophisticated encryption mechanisms to evade detection. One possible solution is the use of adaptive response mechanisms that, upon detection of a given type of network traffic or network loading condition, re-configure the network traffic classification mechanisms to identify and control the traffic. U.S. application Ser. No. 10/295,391, for example, discloses mechanisms that monitor for suspicious activity and change the configuration of a network device in response to the monitored activity. These approaches, however, can be problematic in application traffic management systems, for example, as it is often computationally expensive to re-configure network traffic classification configuration, especially in real-time while the system is operating to manage network traffic.

In light of the foregoing, a need in the art exists for methods, apparatuses and systems that facilitate the classification and control of network traffic based on conditions orthogonal to explicit attributes of packets or the interface on which a packet was encountered, such as the behavior of the nodes corresponding to the network traffic, the loading conditions of a network device in the communications path of the flows, and the metrics associated with the communications path, such as round-trip time, network delay, etc. Embodiments of the present invention substantially fulfill these needs.

SUMMARY OF THE INVENTION

The present invention provides methods, apparatuses and systems directed to the classification of network traffic based on conditions orthogonal to explicit attributes of packets in network traffic. In one implementation, the present invention provides methods, apparatuses and systems directed to the classification of network traffic based on the behavior of one or more nodes associated with the network traffic. In one implementation, a mechanism is provided that allows for the creation of matching rule predicates that match to certain node behaviors of interest and cause the application of appropriate policies to the network traffic. In one implementation, the node behavior matching functionality can be combined to seamlessly operate in connection with other Layer 7 traffic classification mechanisms that operate on explicitly-presented attributes of the packets. In other implementations, the present invention can classify data flows based on other orthogonal conditions, such as observed metrics of the communications path or network devices in the communications path. Implementations of the present invention can be incorporated into a variety of network devices, such as traffic monitoring devices, packet capture devices, firewalls, and bandwidth management devices.

DESCRIPTION OF PREFERRED EMBODIMENT(S)

A. Network Device Configuration

Figure 1:
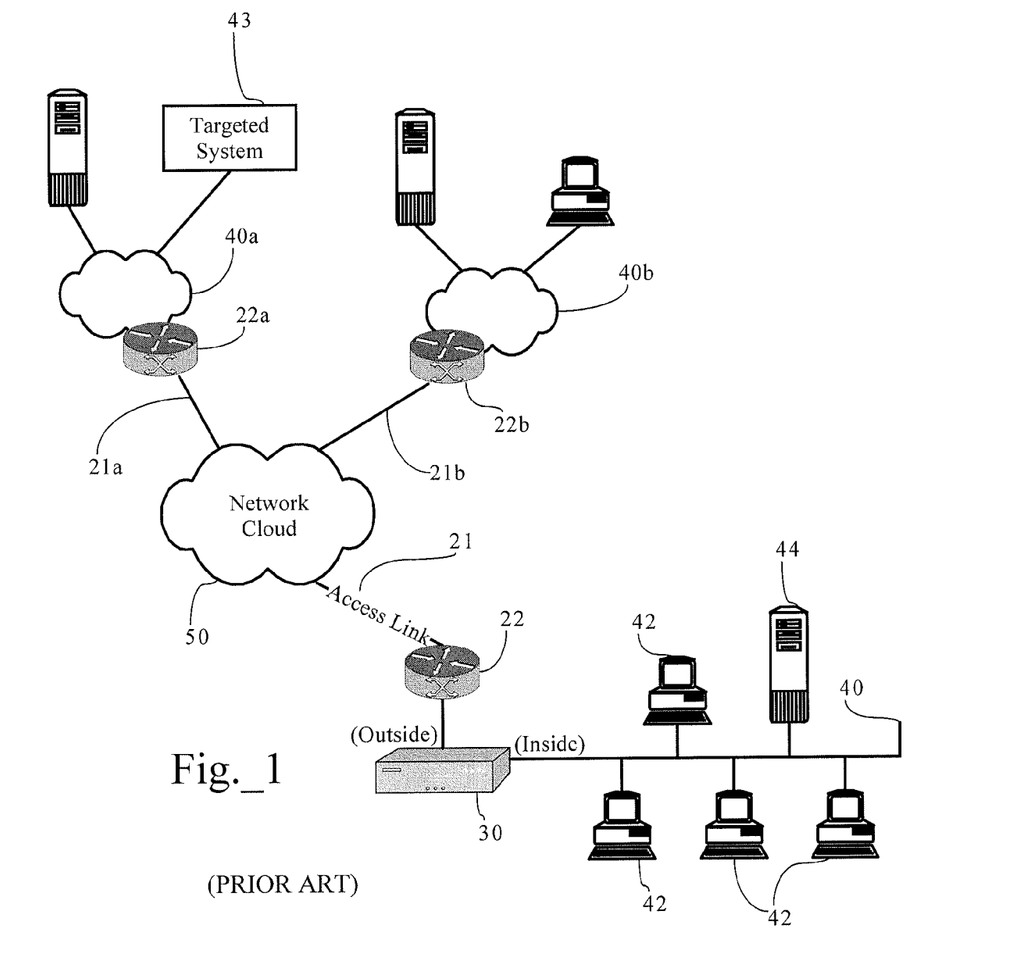
FIG. 1 is a schematic diagram illustrating a computer network including a network device according to an implementation of the present invention.

FIG. 1 illustrates, for didactic purposes, a network environment in which embodiments of the present invention may operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network. As FIG. 1 also illustrates, network device 30, in one implementation, is deployed at the edge of network 40. In one implementation, network device 30 is a network application traffic management device operative to manage data flows traversing access link 21. However, the node behavior classification functionality according to the present invention can be integrated into a variety of network devices, such as proxies, firewalls, packet capture or network monitoring equipment, VPN servers, web services network gateways or brokers, and the like. As FIG. 1 illustrates, network 50 interconnects networks 40, 40*b* which may be networks supporting branch office facilities, and network 40*a*, which may support a central operating or headquarters facility. Furthermore, although not shown in FIG. 1, additional network devices, such as application traffic management devices, firewalls, etc., may be deployed at the edge of networks 40*a*, 40*b*, as well.

Figure 2:
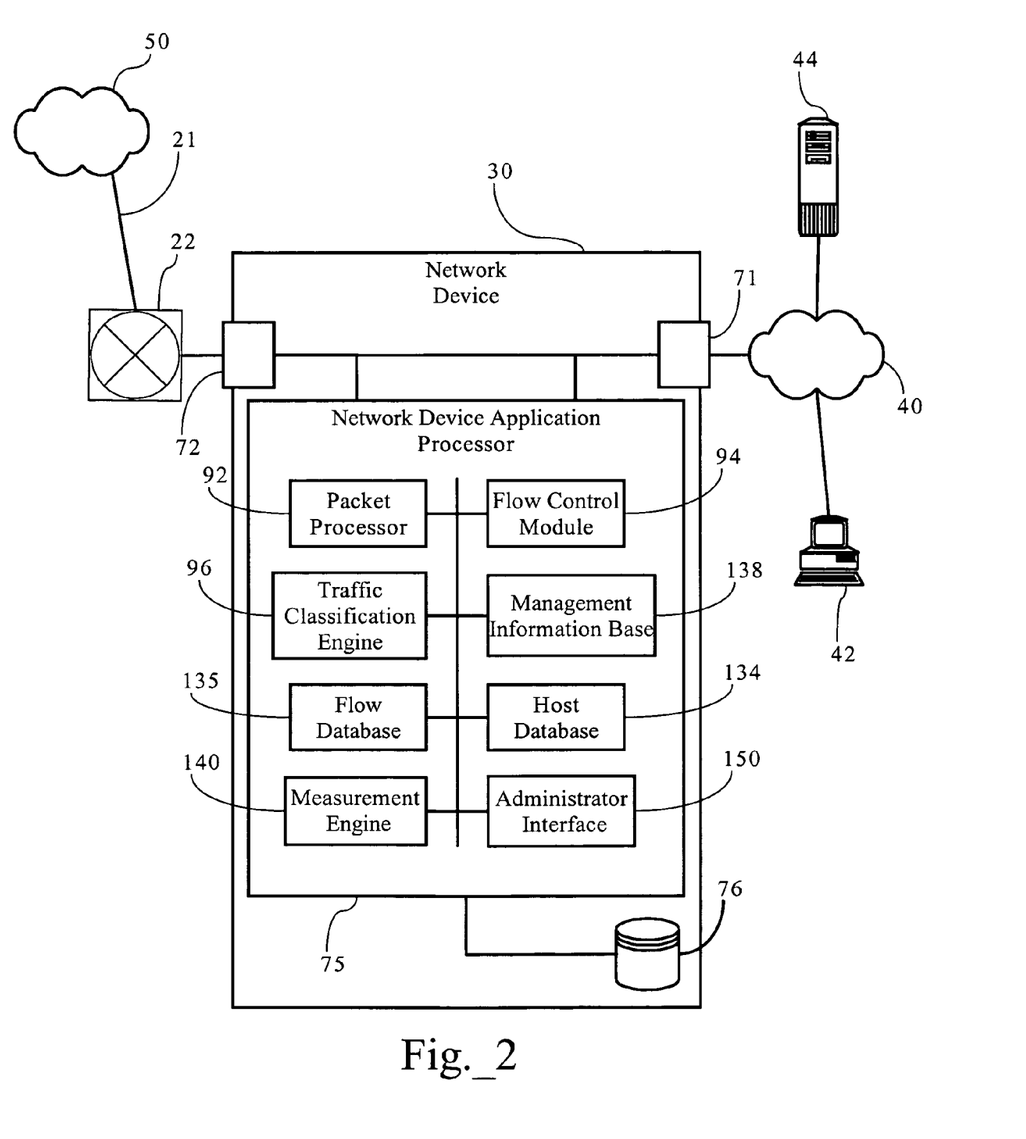
FIG. 2 is a functional block diagram illustrating the functionality of a network device configured according to an implementation of the present invention.

As FIG. 2 illustrates, network device 30, in one implementation, comprises network device application 75, and first and second network interfaces 71, 72, which operably connect network device 30 to the communications path between router 22 and network 40. Network device application 75 generally refers to the functionality implemented by network device 30, such as network monitoring or reporting, application traffic management, security, virtual-private networking, and the like. In one embodiment, network device application 75 is a combination of hardware and software, such as a central processing unit, memory, a system bus, an operating system, device drivers, and one or more software modules implementing the functions performed by network device, as well as the automated deployment and configuration functionality described herein. For didactic purposes, network device 30 is an application traffic management appliance configured to manage network traffic traversing access link 21. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation first and second network interfaces 71, 72 reside on separate network interface cards operably connected to the system bus of network device 30. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, network device 30, in one embodiment, includes persistent memory 76, such as a hard disk drive or other suitable memory device, such writable CD, DVD, or tape drives. In one implementation, network device 30 can include a single network interface. In other implementations, network device 30 can include additional network interfaces, beyond network interfaces 71 and 72, to support additional access links or other functionality. U.S. application Ser. No. 10/843,185 provides a description of the operation of various modules, such as network interface drivers, and data structures for receiving into memory and processing packets encountered at network interfaces 71, 72.

As FIG. 2 illustrates, network device application 75, in one implementation, includes a packet processor 92, flow control module 94, and traffic classification engine 96. Network device application 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of network device 30, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. In one implementation, flow control module 94 is operative to apply bandwidth utilization controls to data flows traversing the access link 21 in the inbound and/or outbound directions.

As discussed above, in one implementation, network device application 75 further comprises measurement engine 140, management information base (MIB) 138, and administrator interface 150. Management information base 138 is a database of standard and extended network objects related to the operation of network device 30. Measurement engine 140 maintains measurement and statistical data relating to operation of network device 30 to allow for monitoring of bandwidth utilization and network performance across access link 21 with respect to a plurality of bandwidth utilization and other network statistics on an aggregate and/or per-traffic-class level.

Administrator interface 150 facilitates the configuration of network device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to populate one or more fields in the data structures. In one embodiment, when packet processor 92 encounters a new data flow it stores the source and destination IP addresses contained in the packet headers in host database 134. Packet processor 92 further constructs a control block (flow) object including attributes characterizing a specific flow between two end systems. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer-a memory space, typically in dynamic random access memory (DRAM), reserved for packets traversing network device 30. In one embodiment, the packets are stored in packet the buffer with a wrapper including various information fields, such as the time the packet was received, the packet flow direction (inbound or outbound), and a pointer to the control block object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and U.S. Pat. No. 6,591,299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to network device 30. See FIG. 1. For a TCP/IP packet, packet processor 92 can compute the inside and outside addresses based on the source and destination network addresses of the packet and the direction of the packet flow.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

To allow for identification of service types (e.g., FTP, HTTP, etc.), packet processor 92, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When network device 30 encounters a new flow, packet processor 92 analyzes the data flow against the service attributes in the services table to identify a service ID corresponding to the flow. In one embodiment, packet processor 92 may identify more than one service ID associated with the flow. In this instance, packet processor 92 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 92 associates the flow with the most specific service ID. A traffic class maintained by traffic classification engine 96 may be configured to include matching rules based on the service IDs in the services table. For example, a matching rule directed to HTTP traffic may simply refer to the corresponding service ID, as opposed to the individual attributes that packet processor 92 uses to initially identify the service.

Figure 5:
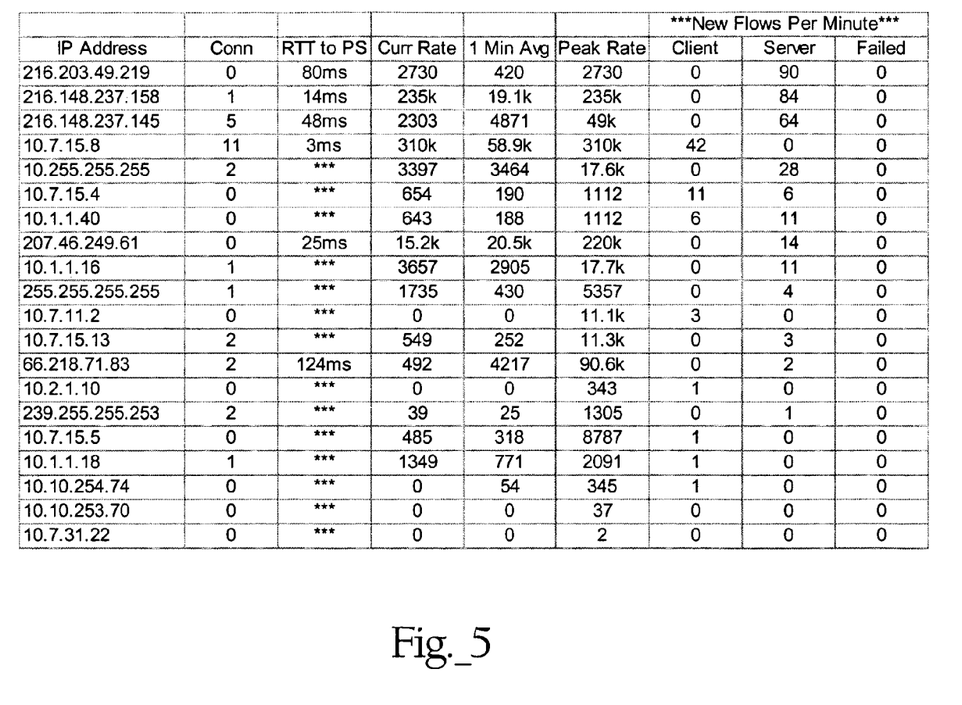
FIG. 5 sets forth the data flow metrics, according to an embodiment of the present invention, maintained for each host associated with data flows traversing a bandwidth management device.

Packet processor 92, in one implementation, maintains certain data in host database 134 that support the node behavior classification operations described below. FIG. 5 illustrates the data flow metrics maintained in host database 134, according to an embodiment of the present invention. As FIG. 5 illustrates, packet processor 92, in one embodiment, maintains, inter alia, for each IP address 1) the number of concurrent connections (Conn); 2) the current data flow rate (Curr rate); and 3) the average bits per second (bps) over a one minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. As discussed above, packet processor 92 is operative to identify new data flows, as well as the termination of existing data flows, and updates the statistics identified above as data flows traverse network device. As discussed below, traffic classification engine 96, in one implementation, is operative to access these values, as well as other data structures (e.g., flow database 135) to classify a data flow. In one embodiment, a process executing in the packet processing path, for example, can collect the raw data at periodic intervals for subsequent evaluation by other processes or modules, such as traffic classification engine 96.

In addition, administrator interface 150 may also access the host database and display its current state to a network administrator. In one implementation, administrator interface 150 allows various views of the information in host database 134 sorted (in ascending or descending order) based on one of the selected data fields of the database. Administrator interface 150, in one implementation, is also operative to facilitate configuration of a traffic class based on one or more attributes maintained by the host database 134. For example, administrator interface 150 may allow a user to select one or more entries (as well as one or more data fields) in host database 134 and use the values corresponding to the selected entries and data fields to configure a traffic class. For example, administrator interface 150 can compute the minimum values for each data field across the selected entries and use them as the basis for matching attributes in a traffic class.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, network device 30 includes functionality allowing for classification of network traffic based on information from layers 2 to 7 of the OSI reference model. Network device 30 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, network device 30 is configured to include a predefined set of traffic classes based upon a knowledge base gleaned from observation of common or known traffic types on current networks. Network device 30, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, network device 30 may also include traffic class discovery functionality that automatically adds traffic classes to traffic classification engine 96 in response to data flows traversing the device. Automatic traffic discovery and classification, see below, is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for network device 30, such as requests for stored measurement data or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Network device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

In one implementation, network device application 75 further includes a traffic discovery module (not shown) that analyzes data flows for which no matching traffic class was found in traffic classification engine 96. The traffic discovery module, in one embodiment, is operative to apply predefined sets of matching rules to identify a traffic class corresponding to non-matching data flows. In one implementation, the traffic discovery module can be configured to apply matching rules that include the node behavior predicates discussed below and automatically add a "wild_nodes," or other, traffic class (including default bandwidth utilization controls) to the configuration of traffic classification engine 96. In one implementation, the traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing bandwidth management device 130 and stores such traffic classes in traffic classification engine 96. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 96. In one embodiment, such discovered traffic classes are, by default, attached to or associated with either the "/Inbound/Autodiscovered/" or "/Outbound/Autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198,051, incorporated by reference herein, discloses automatic assignment of bandwidth utilization controls for discovered traffic classes. Furthermore, as discussed above, the traffic discovery module is operative to dynamically adjust one or more traffic discovery thresholds depending on at least one observed parameter or attribute, such as the rate of discovering new traffic classes relative to the number of data flows.

In one implementation, the traffic discovery module automatically adds newly discovered traffic classes to traffic classification engine 96, which are presented to the network administrator with manually configured and/or previously discovered traffic classes. In an alternative embodiment, the traffic discovery module may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The network manager may then take some action (e.g. pushing a button) to select the traffic types she wishes to add to the classification tree.

A.2.b. Orthogonal Attribute Classification

Traffic classification engine 96, in one implementation, supports matching rule predicates that correspond to various conditions, such as node behavior and path metrics, that are orthogonal to explicit packet attributes. In some implementations, this allows for a bandwidth management scheme that can classify data flows relative to the observed behavior of either one of, or both, the end systems or nodes associated with a data flow and can apply appropriate policies to the flows. In one implementation, the matching rule predicates for node behavior are based on statistics maintained by host database 134 (see above), such as the numbers of currently active flows (in the aggregate or with respect to a certain protocol, such as TCP or UDP) and rate of new flows. In other implementations, additional or alternative matching rule predicates can be created based on network path metrics, such as observed round-trip time, packet exchange time, normalized network delay, server delay, total delay, and/or current transmission rate (bps). U.S. application Ser. No. 10/812,198 discloses the computation of how these metrics can be computed. Computation of packet exchange time is disclosed in U.S. application Ser. No. 09/710,442. Other characteristics orthogonal to packet attributes that one could use to classify traffic are current CPU utilization or the inbound or outbound link utilizations. For example, data flows can be classified based on the CPU utilization or load placed on network device 30, access link 21 and/or even router 22 (by polling its interface via SNMP, for example), as opposed to the behavior of the corresponding end systems or explicit packet attributes of a given flow. In one implementation, the matching rules, traffic classes, and policies can be created once and continue to carry out their objectives without any reconfiguration of traffic classification engine 96. Still further, these orthogonally-based predicates may be combined with matching rules that operate on attributes of the packets themselves (see above) to achieve a variety of objectives.

The following provides matching rule predicates, according to one implementation of the invention, that can be used in connection with configuration commands entered in a command line interface:

1) client-flow-rate:<low>-<high>: This command specifies a range for the number of new flows or connections for which the host is a client over the last minute. This predicate can be applied to inside and/or outside hosts relative to network device 30 (see Section A.1., above). The rates are specified in flows-per-minute (FPM) or you may use "unlimited" for the <high>value.

2) server-flow-rate:<low>-<high>: This command specifies a range for the number of new flows or connections for which the host is a server over the last minute. This predicate can be applied to inside and/or outside hosts 3) failed-flow-rate:<low>-<high>: This command specifies a range for the number of failed flows or connections for which a host is a client. For TCP flows, a failed flow can be detected when a RST packet is transmitted in response to a SYN packet, or when no response to a SYN packet is received after a threshold period of time.

4) tcp-flows:<low>-<high>: This command specifies a range of the number of current TCP flows for a host.

5) udp-flows:<low>-<high>: This command specifies a range of the number of current UDP flows for a host.

Figure 3A:
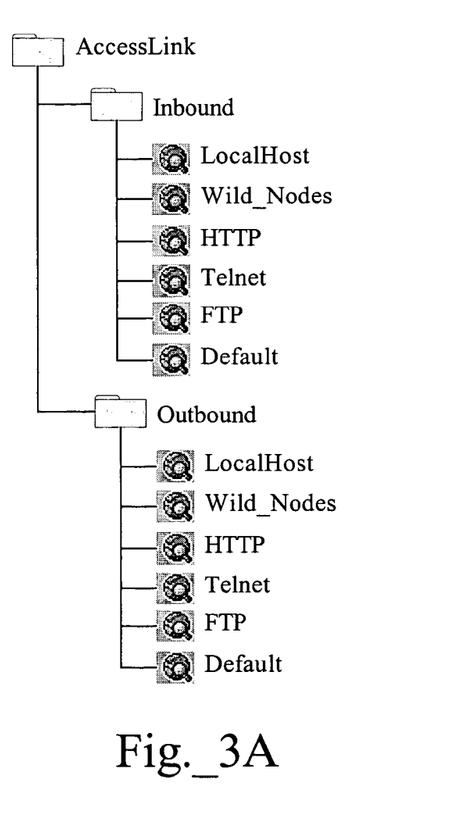
FIG. 3A is a diagram illustrating a traffic classification configuration for a given access link according to an embodiment of the present invention.
Figure 3B:
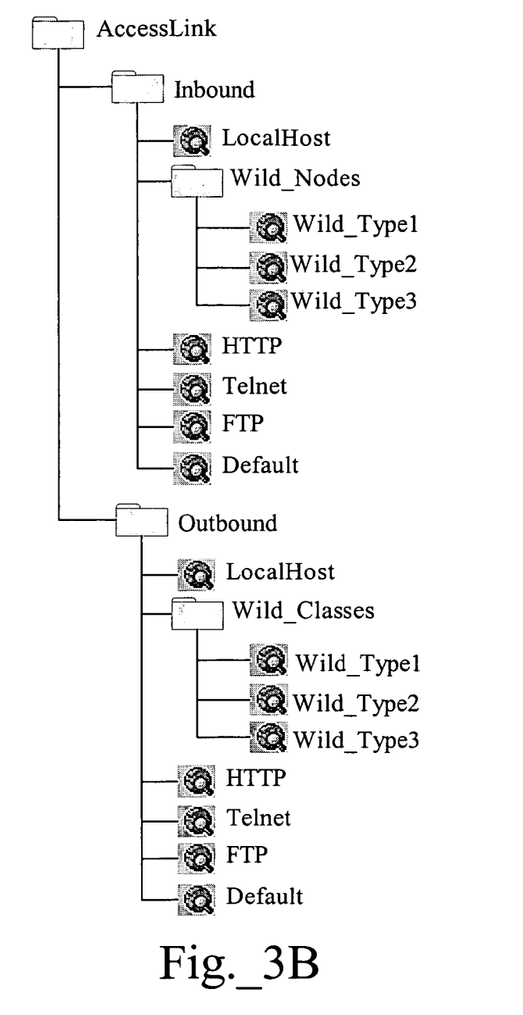
FIG. 3B is a diagram illustrating a traffic classification configuration for a given access link according to another embodiment of the present invention.

FIGS. 3A and 3B illustrate two traffic classification configurations according to different embodiments of the present invention. As discussed above, traffic classification engine 96 is configured to apply the matching rules of each traffic class in the order in which they are configured. The "LocalHost" traffic class corresponds to data flows destined for network device 30, such as requests for stored measurement data or device configuration changes. If a traffic class is found, the traffic classification engine 96 stops the instant search process and returns the identified traffic classification. FIG. 3A illustrates a traffic classification configuration including a "Wild_Nodes" traffic class. In one embodiment, the Wild_Nodes traffic class can include at least one matching rule/attribute based on the matching rule predicates discussed above, or other behavioral attributes. As FIG. 3A illustrates, a variety of traffic classes are based on well-known protocols or network applications, such as HTTP, which may also match the data flows corresponding to nodes that exhibit a behavior that matches the "Wild_Nodes" traffic class. Accordingly, placing the "Wild_Nodes" traffic class before other traffic classes allows for the classification of data flows based on the observed behaviors of the corresponding hosts and, thus, the application of appropriate bandwidth utilization controls. In addition, FIG. 3A shows the Wild_Nodes traffic class as a leaf node in the traffic classification configuration hierarchy. However, in other embodiments, the traffic classification scheme can be configured such that the Wild_Nodes traffic class includes one or more child traffic classes (e.g., Wild_Type1, Wild_Type2, etc.) to allow for controlling bandwidth utilization for different types of observed behaviors, or on some orthogonal bases, such as on an application-level or other, more granular basis, as well. For example, in one embodiment, the Wild_Nodes traffic class can be configured to include a copy of the traffic classification configuration scheme associated with regular network traffic. According to such an embodiment, different bandwidth utilization controls can be configured for different Wild_Type traffic classes.

A.3. Flow Control Module

As discussed above, flow control module 94 applies bandwidth utilization controls (and, in some embodiments, other policies) to data flows traversing access link 21. The above-identified patents and patent applications describe the operations of, and bandwidth utilization controls, implemented or supported by flow control module 94. Network device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections A.3.a. & A.3.b.). The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. For example, a network administrator may configure a partition for data flows associated with suspicious users to limit the effect of the network traffic associated with them on utilization of access link 21.

A.3.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994, now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.4. Enforcement of Bandwidth Utilization Controls

Figure 4:
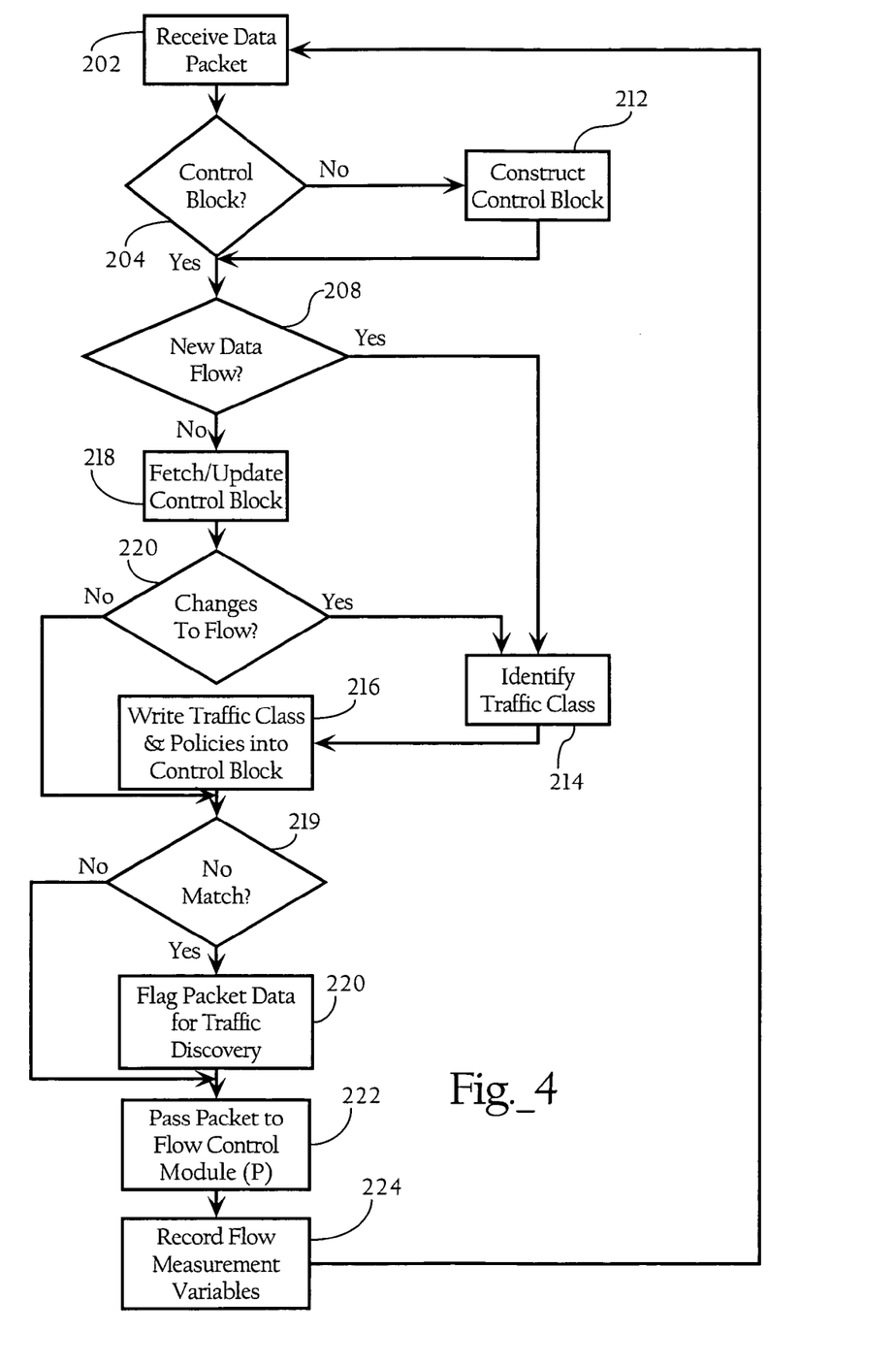
FIG. 4 is a flow chart diagram providing a method directed to enforcing bandwidth utilization controls on data flows.

FIG. 4 illustrates a method, according to one embodiment of the present invention, directed to the enforcement of bandwidth utilization controls on data flows transmitted across access link 21 and, therefore, traversing network device 30. The exact method for enforcing bandwidth utilization controls, however, is not critical to the present invention; any suitable method can be employed.

In one embodiment, packet processor 92 receives a data packet (FIG. 4, 202) and determines whether flow database 135 contains an existing control block object corresponding to the data flow (204) (see Section A.1., supra). If no control block object corresponds to the data packet, packet processor 92 constructs a control block object including attributes characterizing the data flow, such as source address, destination address, service type, etc. (212) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 4 illustrates, packet processor 92 then determines whether the received packet is part of a new data flow (208) or represents a change to an existing data flow (see 218 and 220). Methods for determining new data flows and assigning packets to existing data flows are well known in the art and also depend on the particular transport Layer protocol employed. For a TCP packet, packet processor 92 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow. In some embodiments, packet processor 92 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 92 retrieves the control block object, and associates the packet with the control block object (218). If elements of the data packet represent a change to the traffic type associated with the data flow (220), packet processor 92 passes the flow specification object to traffic classification engine 86 to identify a traffic class corresponding to the flow (214) (see FIG. 6 and discussion below). Methods for determining changes to data flows are also well known in the art. For example, an email may include an attached digital image file. Accordingly, while the initial packets in the data flow may include simple text data, subsequent packets may contain image data. Packet processor 92, in one embodiment, is operative to detect such changes in the characteristics of the data flow by examining data encapsulated in upper layers of each packet, such as the detection of MIME types, etc.

As discussed above, to identify a traffic class associated with the data flow, packet processor 92 passes the control block object (or a pointer to the control block object) to traffic classification engine 86. In one embodiment, the control block object or a copy of it is stored in association with the packet and in the same buffer structure to facilitate access to the control block object by traffic classification engine 86. As discussed in more detail below, traffic classification engine 86 operates on attributes of the control block object and/or flow specification object, (and potentially on the packet stored in the buffer structure) to identify traffic class(es) associated with the data flow (214). In one embodiment, the control block object in flow database 135 includes a pointer to the identified traffic class(es) in traffic classification engine 96. In one embodiment, the traffic classification engine 96 stores in the control block object the policy parameters (e.g., bandwidth utilization control parameters, security policies, etc.) associated with the identified traffic classes (216). As discussed above, if the data flow does not match an existing traffic class (219), packet processor 92 or traffic classification engine 96 flags the packet for the traffic discovery module (220). In one embodiment, a data flow that does not match an existing traffic class is classified in the default traffic class. If the packet is flagged (220), the traffic discovery module operates on attributes of the data flow to classify it as discussed above. If the identified traffic class exceeds a discovery threshold, the traffic discovery module, in one implementation, adds the discovered traffic class to traffic classification engine 96. In one implementation, the traffic discovery module also writes default bandwidth utilization controls and/or other policies (such as security or redirection policies) into traffic classification engine 96. In another embodiment, newly discovered traffic classes can be added to a separate list, or other data structure, from which a network administrator may elect to add to the traffic classification configuration maintained by traffic classification engine 96.

Packet processor 92 then passes the packet to rate control module 94 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 4 illustrates, packet processor 92 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

Figure 6:
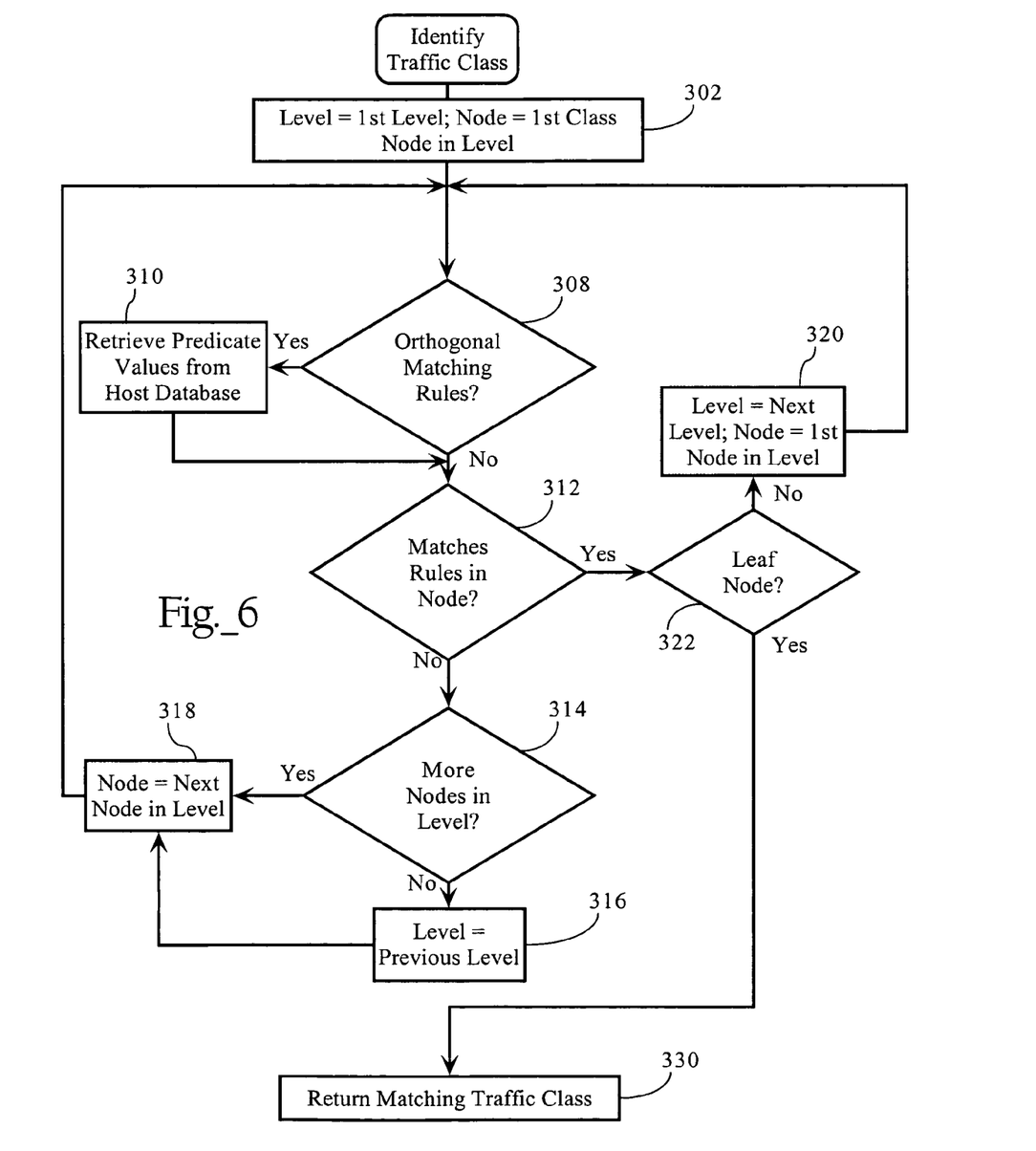
FIG. 6 is a flow chart diagram illustrating the operations, according to an implementation of the invention, associated with classification of network traffic.

FIG. 6 sets forth operations associated with traversing a hierarchical traffic class configuration to identify a matching traffic class node. In one implementation, traffic classification engine 96 first initializes certain local variables, such as a match Boolean variable indicating whether a match has been found, a level variable indicating the current search level in the traffic class hierarchy, and a node variable (302). As FIG. 6 illustrates, traffic classification engine 96 traverses the nodes in the traffic class hierarchy until a matching leaf node is found and then returns the matching traffic class (see FIG. 6, 316, 318, 320, etc.). As discussed above, each node in the traffic class hierarchy includes at least one matching rule or attribute. When traffic classification engine 96 performs a matching operation relative to a given node, in one implementation, it first determines whether the node includes orthogonal matching rules (308) and, if so, retrieves the predicate values from the host database 134 or other source of the matching attribute data (310). For example, traffic classification engine 96 may access host database 134 to retrieve the number of current connections associated with the source address of the packet(s) in the data flow. In addition, traffic classification engine 96 may access a management information base (MIB) 139 or measurement engine 140 of network device 30 or a remote device in addition to, or in lieu of, host database 134. If the data flow matches the rules in a given node (312), traffic classification engine 96 returns the matching traffic class (330), if the node is a leaf node (322). Otherwise, traffic classification engine 96 proceeds to the child node(s) of the current node (320) to perform additional matching operations. If the data flow does not match the current node, traffic classification engine 96 proceeds to other nodes in the same level of the traffic class hierarchy (314, 318), or proceeds to additional nodes in previous levels in the traffic class hierarchy (316, 318). As FIG. 6 illustrates, traffic classification engine 96 traverses the hierarchical traffic class configuration until a matching traffic class is found, where the /Inbound/Default and /Outbound/Default traffic class nodes are the last nodes to be traversed.

A.5. Illustrative Configurations

The following commands, entered in a command line interface (in one implementation), illustrate how certain implementations of the present invention can be used.

class new /Outbound Wild inside IP client-flow-rate:100-unlimited
        class set /Outbound/Wild exception
        policy apply priority /Outbound/Wild 0
        policy admit /Outbound/Wild squeeze
        class category /Outbound/Wild wild
        packetcapture limit packets 5
        packetcapture add /Outbound/Wild
        policy flowlimit /Outbound/Wild 200 300
        event new NewTCPFlows tcp-conn-inits.class>$11$m$
        event register NewTCPFlows(/Outbound/Wild,5,3) email trap limit=5

The first command creates a new traffic class named /Outbound/Wild including a matching rule based on the client flow rate of inside hosts. In this didactic example, a network administrator configures the lower client-flow-rate threshold of 100 based on an assumption or observation that such a flow rate indicates that the inside host may be infected with a virus that causes it to launch a DDoS attack. The "class set <traffic class> exception command related to the matching operations of traffic classification engine 96. As discussed above, when traffic classification engine 96 classifies a data flow, it searches the hierarchical traffic tree (see FIGS. 3A and 3B), beginning at the top, to find a match for the flow. As soon as traffic classification engine 96 finds a match, it categorizes the flow into the appropriate class and looks no further down the tree (even if there may be another class that matches the traffic flow). To change the order that traffic classification engine 96 uses to find a match for a traffic flow, the "exception" command can be used to create an exception class. An exception class sorts above standard classes in a traffic sub-tree and, thus, provides the ability to redefine the search order that traffic classification engine 96 uses to find a match for a traffic flow.

The third command applies a per-flow rate control policy, setting data flows matching the Wild class to a priority of zero. The "policy admit" command configures an admission-control mechanism supported by network device 30 and determines what happens when there isn't enough bandwidth to satisfy a guaranteed rate allocation. When the mechanism is squeeze, new connections or flows will get a predetermined maximum bandwidth allocation (e.g., at most 256 bps). When the mechanism is refuse, the connection is refused. The "class category /Outbound/Wild wild" command sets the /Outbound/Wild class to the wild category. Inside hosts matching this class will be recorded in the measurement engine 140 in the Host Accounting group in category wild. A network administrator can later retrieve a list of IP addresses and times via the "host accounting retrieve" or "me dump" commands. In one implementation, network device 30 includes packet capture functionality. U.S. application Ser. No. 10/453,345 discloses flow-based packet capture functionality. In one implementation, the "packetcapture limit packets 5" command enables the packet capture functionality supported by network device 30, limiting the capture to the first five packets of each flow. The "packetcapture add" command adds the /Outbound/Wild class to the list of traffic classes for which packet capture is enabled. The "policy flowlimit" command causes network device 30 to begin to discard packets after the client-flow-rate of the inside host reaches 200. This allows network device 30 to capture sufficient diagnostic information concerning the inside hosts, before discarding packets. In addition, network device 30 may also include event notification mechanisms that inform a network administrator when network traffic matches the specified class. For example, the "event new NewTCPFlows" command creates an event, while the following "event register" command registers the /Outbound/Wild class with the event notification mechanism that would send a network administrator an email or other notification when sufficient flows have been classified into the /Outbound/Wild class.

As the following command set demonstrates, in one implementation, network device 30 can be configured to limit the node behavior matching to specific services or applications (or VLANS, etc.) if desired. Note that, in the implementation described herein, the TCP flows counted for the inside hosts are across all services and for that host acting as either client or server.

class new /Inbound Slosh inside Kazaa tcp-flows:50-unlimited
    class rule add /Inbound/Slosh inside Gnutella tcp-flows: 50-unlimited
    partition apply /Inbound/Slosh 0 13K The foregoing commands create a "slosh" traffic class for Kazaa and Gnutella traffic and configures a partition capped at 13 Kbps.

Stilt further, the node behavior classification functionality can also be directed to internal or "inside" servers.

hl new ServerList sales.me.com support.me.com marketing me.com
    class new /Inbound NotSoFast inside list:ServerList server-flow-rate:100-unlimited
    policy apply never-admit /Inbound/NotSoFast
    policy admit /Inbound/NotSoFast refuse web The "hl new ServerList" command specifies a group of servers by domain address and limits the new connection rate to the 3 internal servers to 100 new flows per minute (each). The "class new" command creates a traffic class based on the server list and a behavior attribute (server-flow-rate). According to the configuration set forth above, data flows corresponding to the servers in the Server List receive the "web refuse" treatment, when the connection rate exceeds the specified threshold.

Myriad configurations are possible. For example, network device 30 can include the dynamic partitioning functionality disclosed in U.S. application Ser. No. 09/966,538.

class new /Outbound Early inside IP tcp-flows:0-10
    partition apply /Outbound/Early 1M 5M
    partition dynamic apply /Outbound/Early per-address inside 10K 100K
    partition dynamic cap /Outbound/Early 100 0 250K class new /Outbound/Early NNTP outside NNTP
policy apply priority /Outbound/Early/NNTP 1
class new /Outbound/Early Citrix outside Citrix
policy apply priority /Outbound/Early/Citrix 6
class set /Outbound/Early exception The commands set forth above create a configuration according to which network device creates dynamic partitions for the first 11 flows for each inside host. Subsequent flows for a given host do not meet the specified predicate (tcp-flows:0-10) and are classified lower in the traffic classification hierarchy (see Section A.2., above).

Lastly, although the present invention has been described as operating in connection with end systems and networks primarily employing the HTTP, TCP and IP protocols, the present invention has application in computer network environments employing any suitable network protocol suite. In addition, while, in the embodiments described above, the operations associated with the present invention are distributed across various modules, a variety of other implementations featuring different distributions of the operations are possible. Still further, while certain of the implementations described above include two interfaces, the present invention can be applied to network devices having one to a plurality of network interfaces. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating management of network traffic, comprising
    detecting, at a network device, data flows in network traffic traversing a communications path, wherein the data flows each comprise at least one packet transmitted between respective source and destination nodes;
    maintaining, at the network device, one or more metrics in association with each of the data flows, wherein the one or more metrics is orthogonal to the explicitly presented attributes of the packets in the data flows;
    matching the data flow to a plurality of traffic classes, wherein at least one of the traffic classes is defined, at least in part, by one or more metric values, wherein matching the data flow, for the at least one of the traffic classes, comprises comparing the one or more metrics associated with the data flow to corresponding ones of the one or metric values of the at least one of the traffic classes; and
    having found a matching traffic class in the plurality of traffic classes, associating the data flow with the matching traffic class;
wherein at least one of the one or more metrics is a behavioral metric corresponding to the source or destination nodes relative to a behavioral attribute the behavioral attribute being an instance of any of the following: a total number of current connections a total number of current connections for which a node is client, a total number of current connections for which a node is a server, a total number of current TCP connections, a total number of UDP connections, a server new flow rate, a client new flow rate, a server TCP new flow rate, a server UDP new flow rate, a client TCP new flow rate, a client UDP new flow rate, a rate of failed flows.

2. The method of claim 1 wherein one of the one or more metrics is the computational load of a network device in the communications path.

3. The method of claim 1 wherein one of the one or more metrics is a CPU utilization corresponding to a network device in the communications path.

4. The method of claim 1 wherein one of the one or more metrics characterizes an attribute of the communications path.

5. The method of claim 4 wherein the attribute of the communications path is the round trip time.

6. The method of claim 4 wherein the attribute of the communications path is a packet exchange time.

7. The method of claim 1 wherein one of the one or more metrics is server delay.

8. The method of claim 1 further comprising
    controlling the data flows based on the corresponding traffic classes identified in the matching step.

9. A method facilitating management of network traffic, comprising
    detecting data flows in network traffic traversing a communications path, wherein the data flows each comprise at least one packet transmitted between respective source and destination nodes;
    recording, based on the detected data flows, behavioral metrics for the source and destination nodes relative to a behavioral attribute, the behavioral attribute being an instance of any of the following: a total number of current connections, a total number of current connections for which a node is client, a total number of current connections for which a node is a server, a total number of current TCP connections, a total number of UDP connections, a server flow rate, a client flow rate, a server TCP flow rate, a server UDP flow rate, a client TCP flow rate, a client UDP flow rate, a rate of failed flows;
    matching the data flow to a plurality of traffic classes, wherein at least one of the traffic classes is defined, at least in part, by the behavioral attribute, wherein matching the data flow, for the at least one of the traffic classes, comprises comparing the behavioral metrics associated with the data flow to corresponding ones of the behavioral attribute of the at least one of the traffic classes; and
    having found a matching traffic class in the plurality of traffic classes, associating the data flow with the matching traffic class.

10. The method of claim 9 further comprising
    parsing explicit attributes of at least one packet associated with the data flows into a flow specification, and wherein the matching step comprises
    matching the flow specification to the plurality of traffic classes.

11. The method of claim 10 wherein the flow specification contains at least one instance of any one of the following: a protocol family designation, a direction of packet flow designation, a protocol type designation, a pair of hosts, a pair of ports, a service identifier, a differential network service identifier, a network interface identifier, an MPLS tag, a VLAN identifier, the location of an end-point, a network address, a subnet, a MAC address, and a pointer to an application-specific attribute.

12. The method of claim 10 wherein at least one of the traffic classes is defined by one or more matching attributes, wherein said flow specification contains, and the one or more matching attributes, include, at least one instance of any one of the following: a protocol family designation, a direction of packet flow designation, a protocol type designation, a pair of hosts, a pair of ports, a service identifier, a network interface identifier, a differential network service identifier, an MPLS tag, a VLAN identifier, the location of an end-point, a network address, a subnet, a MAC address, and a pointer to an application-specific attribute.

13. The method of claim 9 further comprising
controlling the data flows based on the corresponding traffic classes identified in the matching step.

14. A method facilitating management of network traffic, comprising
detecting data flows in network traffic traversing a communications path, wherein the data flows each comprise at least one packet transmitted between respective source and destination nodes;
monitoring, based on the detected data flows, a number of transport layer connections associated with the source and destination nodes corresponding to the data flows;
matching the data flows to a plurality of traffic classes, wherein at least one traffic class is defined at least in part by one or more explicitly presented packet attributes and a number of transport layer connections associated with the source or destination node;
having found respective matching traffic classes in the plurality of traffic classes, associating the data flows with the respective matching traffic classes.

15. The method of claim 14 further comprising
parsing explicit attributes of at least one packet associated with the data flows into respective flow specifications, and wherein the matching step comprises
matching the flow specifications to the plurality of traffic classes.

16. The method of claim 14 further comprising
controlling the data flows based on the corresponding traffic classes identified in the matching step.

17. A method facilitating management of network traffic, comprising
detecting, at a network device, data flows in network traffic traversing a communications path, wherein the data flows each comprise at least one packet transmitted between respective inside and outside nodes relative to the network device;
monitoring, based on the detected data flows, a number of transport layer connections associated with the inside and outside nodes corresponding to the data flows;
matching the data flows to a plurality of traffic classes, wherein at least one traffic class is defined at least in part by one or more explicitly presented packet attributes and a number of transport layer connections associated with the inside or outside node;
having found respective matching traffic classes in the plurality of traffic classes, associating the data flows with the respective matching traffic classes.

18. The method of claim 17 further comprising
controlling the data flows based on the corresponding traffic classes identified in the matching step.

19. The method of claim 17 further comprising
parsing explicit attributes of at least one packet associated with the data flows into respective flow specifications, and wherein the matching step comprises
matching the flow specifications to the plurality of traffic classes.

* * * * *